United States Patent [19]

Cortese

[11] Patent Number: 5,473,973
[45] Date of Patent: Dec. 12, 1995

[54] PERCOLATOR CUP FOR ESPRESSO COFFEE MACHINES

[75] Inventor: Virginio Cortese, Turin, Italy

[73] Assignee: Essegielle S.r.l., Turin, Italy

[21] Appl. No.: 232,974

[22] Filed: Apr. 25, 1994

[30] Foreign Application Priority Data

Apr. 27, 1993 [IT] Italy .................................. TO93A0288
Jun. 30, 1993 [IT] Italy .................................. TO93A0476

[51] Int. Cl.⁶ .................................................. A47J 31/24
[52] U.S. Cl. ............................. 99/295; 99/299; 99/302 R
[58] Field of Search ....................... 99/295, 306, 302 R, 99/302 C, 302 FB, 302 P, 316, 317, 279, 299; 426/433

[56] References Cited

U.S. PATENT DOCUMENTS

| 4,595,824 | 6/1986 | Harvey et al. | 392/479 |
| 4,882,982 | 11/1989 | Muttoni | 99/295 |

FOREIGN PATENT DOCUMENTS

| 0264352 | 4/1988 | European Pat. Off. . | |
| 517038 | 12/1992 | European Pat. Off. . | |
| 2299839 | 9/1976 | France . | |
| 2441373 | 6/1980 | France . | |
| 2558052 | 7/1985 | France . | |
| 2655529 | 6/1991 | France . | |
| 206820 | 2/1984 | German Dem. Rep. | 392/449 |
| 255979 | 4/1988 | German Dem. Rep. . | |
| 550785 | 5/1932 | Germany . | |
| 1579422 | 8/1970 | Germany . | |
| 2348336 | 4/1975 | Germany . | |
| 7602306 | 1/1976 | Germany . | |
| 3035157 | 4/1982 | Germany . | |
| 8715900 | 1/1988 | Germany . | |
| 3709268 | 9/1988 | Germany . | |
| 3720927 | 12/1988 | Germany | 392/481 |
| 8900220 | 3/1989 | Germany . | |
| 4129814 | 3/1993 | Germany . | |
| 322900 | 11/1934 | Italy | 392/480 |
| 496053 | 7/1955 | Italy | 392/451 |
| 416019 | 1/1967 | Switzerland . | |
| 1319783 | 6/1973 | United Kingdom | 392/452 |

*Primary Examiner*—Robert W. Jenkins
*Attorney, Agent, or Firm*—Shlesinger, Arkwright & Garvey

[57] ABSTRACT

A percolator cup for espresso coffee machines, wherein a cup-shaped casing defines a compartment for ground coffee, and an outlet separated from the compartment by a calibrated valve element which only connects the compartment to the outlet when the pressure inside the compartment exceeds a given value.

16 Claims, 3 Drawing Sheets

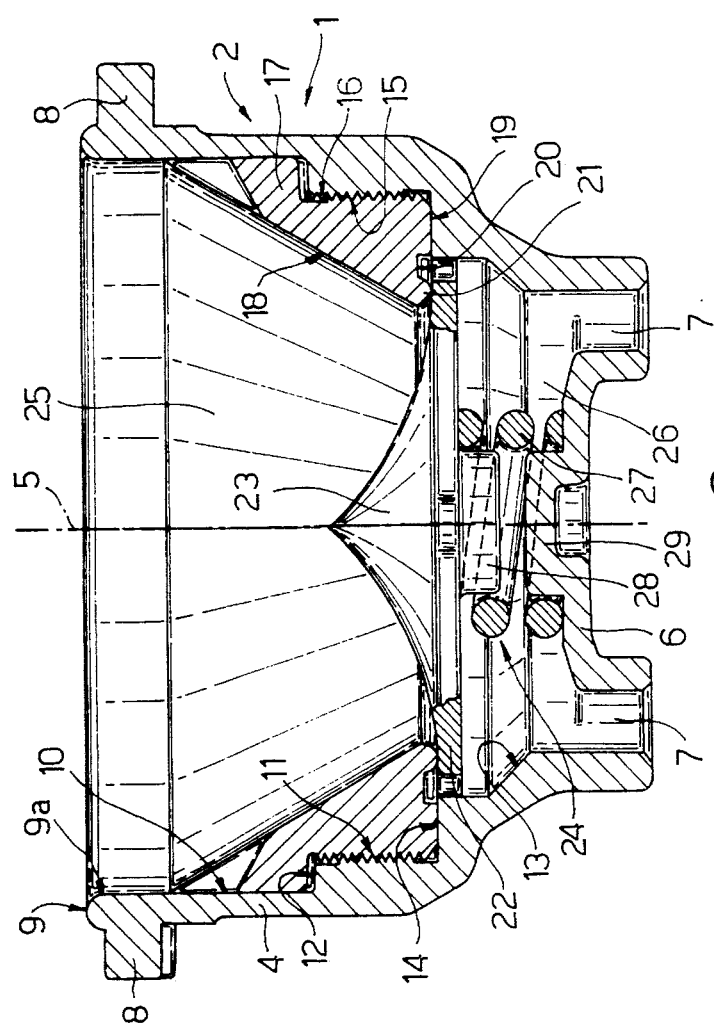
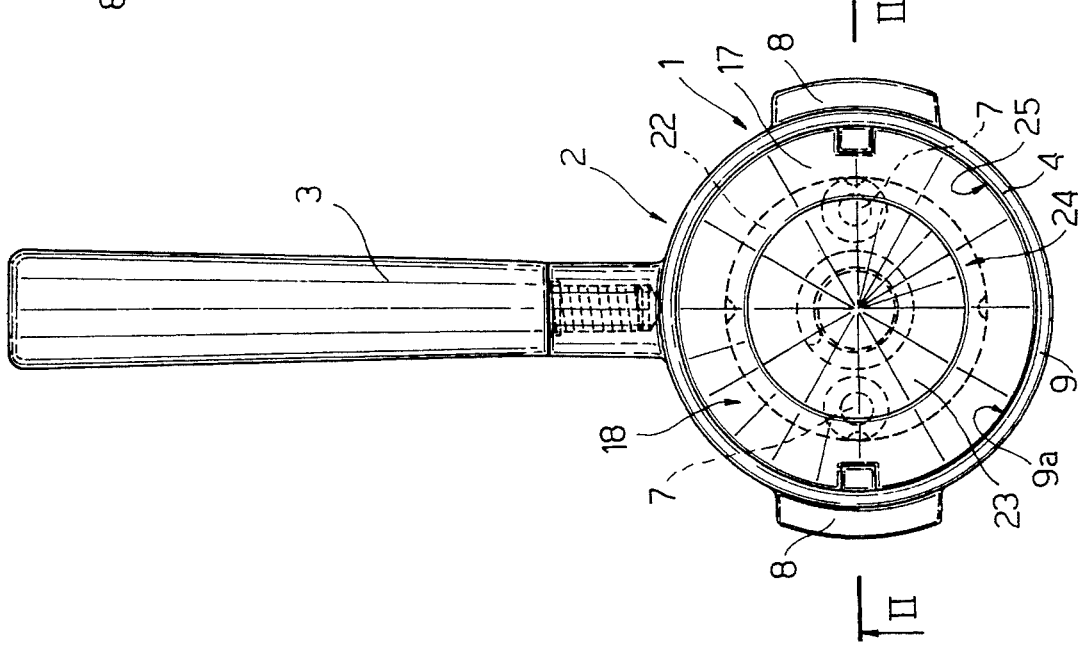

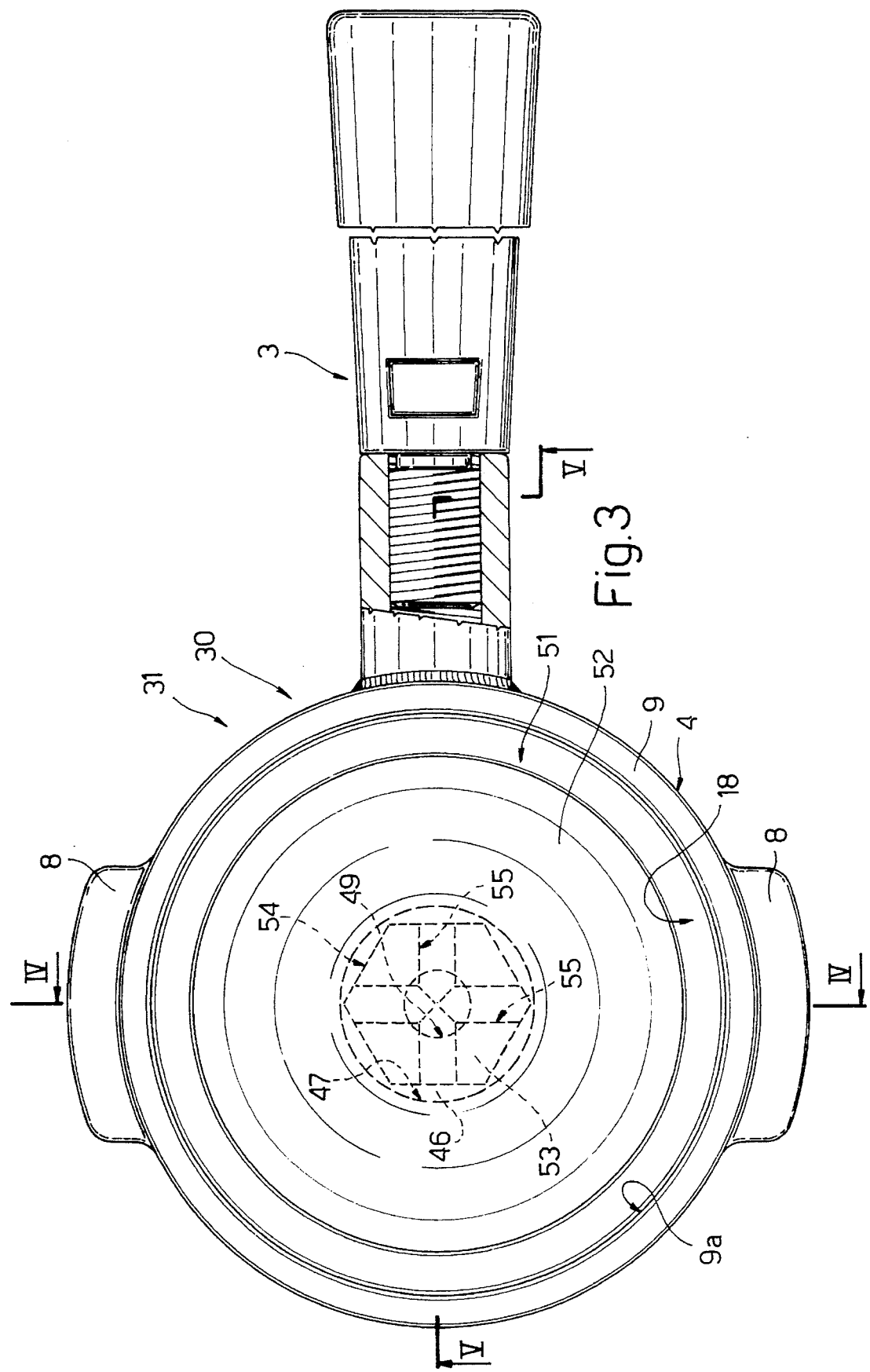

PERCOLATOR CUP FOR ESPRESSO COFFEE MACHINES

BACKGROUND OF THE INVENTION

The present invention relates to a percolator cup, particularly for espresso coffee machines.

In espresso coffee machines, the ground coffee is placed inside a filter cup housed removably inside a cup having at least one outlet conduit at the bottom, and connectable at the top, normally by means of a bayonet joint, to the outlet of a hot water supply device normally consisting of a boiler.

Correct performance of a machine of the aforementioned type depends on the grain size and the amount of ground coffee employed, and the extent to which it is compressed inside the filter cup. All of which factors combine to form, inside the filter cup, a wafer of such volume and consistency as to impede, when impregnated with hot water, outflow of the hot water through the outlet at the bottom, and generate inside the cup a pressure of normally about 10–12 atmospheres. It is known, in fact, that the quality of the espresso coffee produced depends on the temperature and pressure of the water or steam inside the percolator cup, and that no froth (which is the mark of a good espresso coffee) is formed below the above pressures.

SUMMARY OF THE INVENTION

It is an object of the present invention to provide a percolator cup for producing frothy espresso coffee regardless of the grain size and the amount of ground coffee employed, and the extent to which it is compressed inside the cup.

According to the present invention, there is provided a percolator cup for espresso coffee machines, comprising a cup-shaped casing defining a compartment for ground coffee; and an outlet by which the compartment communicates externally; characterized by the fact that it also comprises normally-closed calibrated valve means between said compartment and said outlet, for only connecting the compartment to the outlet when the pressure inside the compartment is above a given threshold value.

BRIEF DESCRIPTION OF THE DRAWINGS

A non-limiting embodiment of the present invention will be described by way of example with reference to the accompanying drawings, in which:

FIG. 1 shows a plan view of a first preferred embodiment of the percolator cup according to the present invention;

FIG. 2 shows a section along line II—II in FIG. 1;

FIG. 3 shows a plan view of a second preferred embodiment of the percolator cup according to the present invention;

DETAILED DESCRIPTION OF THE INVENTION

Figure 4:
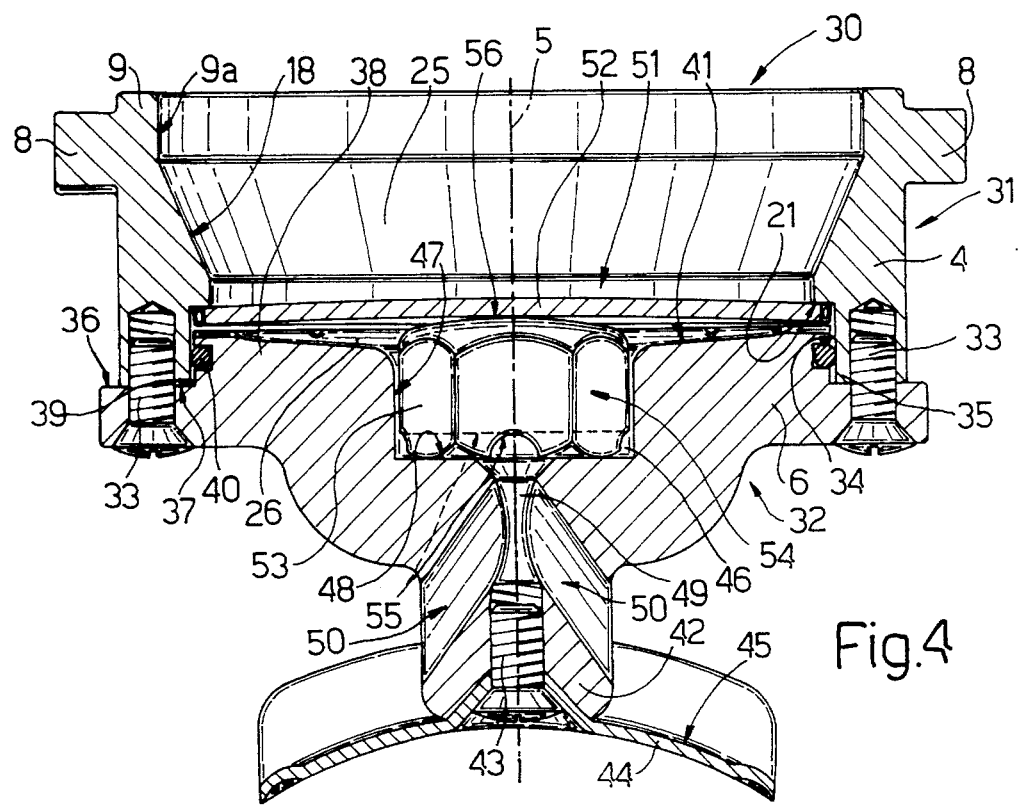
FIG. 4 shows a section along line IV—IV in FIG. 3.

Number 1 in FIG. 1 indicates a percolator cup comprising a cup-shaped casing 2, and a straight handle 3 extending radially from casing 2.

As shown particularly in FIG. 2, casing 2 comprises a substantially cylindrical lateral wall 4 coaxial with an axis 5; a bottom wall 6 substantially perpendicular to axis 5; and two tubular outlet conduits 7 on either side of axis 5 and extending outwards of casing 2 from bottom wall 6. From the opposite end of wall 4 to that connected to wall 6, two diametrically-opposed radial appendixes 8 project radially outwards for connecting cup 1 to an espresso coffee machine (not shown) by means of a known bayonet joint (not shown).

At the opposite end to that connected to wall 6, wall 4 is defined by an edge 9 surrounding a substantially circular opening 9a, and presents an inner surface comprising, from edge 9, a first and smaller-diameter second cylindrical surface 10 and 11 coaxial with axis 5 and connected to each other by an annular shoulder 12; and a substantially truncated-cone-shaped surface 13 tapering towards wall 6 and connected to surface 11 by a second annular shoulder 14 parallel to shoulder 12.

Surface 11 presents a thread 15 engaged by the external thread 16 of an annular stainless steel insert 17 fitted inside casing 2. Insert 17 is defined internally by a truncated-cone-shaped surface 18 tapering towards wall 6, and presents, at the end facing wall 6, a flat annular surface 19 resting on and projecting from shoulder 14 towards axis 5. Surface 19 presents an annular groove 20 coaxial with axis 5 and defining, on the end of insert 17 facing wall 6, an annular lip defining a seat 21 for frontally supporting the outer periphery of a circular plate 22 having a central conical appendix 23 coaxial with axis 5 and projecting inwards of insert 17 towards opening 9a. Plate 22 presents a diameter smaller than the largest diameter of surface 13, and constitutes the movable part of a normally-closed calibrated valve element 24 cooperating in fluidtight manner with lip 21 to divide cup 1 into an upper chamber 25 extending between opening 9a and plate 22 and defined laterally by surface 18, and a lower chamber 26 extending between wall 6 and plate 22 and communicating with conduits 7. In addition to plate 22, valve element 24 also comprises a helical spring 27 fitted to an appendix 28 extending from plate 22 towards wall 6, and an appendix 29 extending from wall 6 towards plate 22. Spring 27 and appendixes 28, 29 are coaxial with axis 5, and spring 27 is so calibrated as to only permit communication between chambers 25 and 26 when the pressure in chamber 25 reaches a given value—in the example shown, about 10–12 atmospheres.

In actual use, any amount of ground coffee (not shown) is placed inside upper chamber 25, and cup 1 is connected to a known espresso coffee machine (not shown) by which it is supplied with a stream of water which seeps through the ground coffee at gradually increasing pressure. When the pressure inside chamber 25, and hence on plate 22, exceeds the pressure exerted by spring 27, plate 22 shifts towards wall 6 to define, with lip 21, an annular passage enabling the liquid coffee in chamber 25 to flow from chamber 25 to chamber 26 and from there to outlet conduits 7. On account of the relatively high pressure (10–12 atmospheres) at which the liquid coffee flows through said passage, it emulsifies with the air to form froth which, in this case, is totally independent of the grain size, quantity and compactness of the ground coffee inside chamber 25, and depends solely on the pressure setting of valve element 24.

The percolator cup according to the present invention thus provides for obtaining good quality espresso coffee using any ground coffee of any grain size, as well as a less than normal amount of noncompacted coffee.

In connection with cup 1 as described above, it should be pointed out that the passage formed between lip 21 and plate 22, when the pressure on plate 22 exceeds that exerted by spring 27, is a substantially virtual passage allowing of no passage of the ground coffee, so that cup 1 presents no filter elements upstream from outlet conduits 7.

Figure 5:
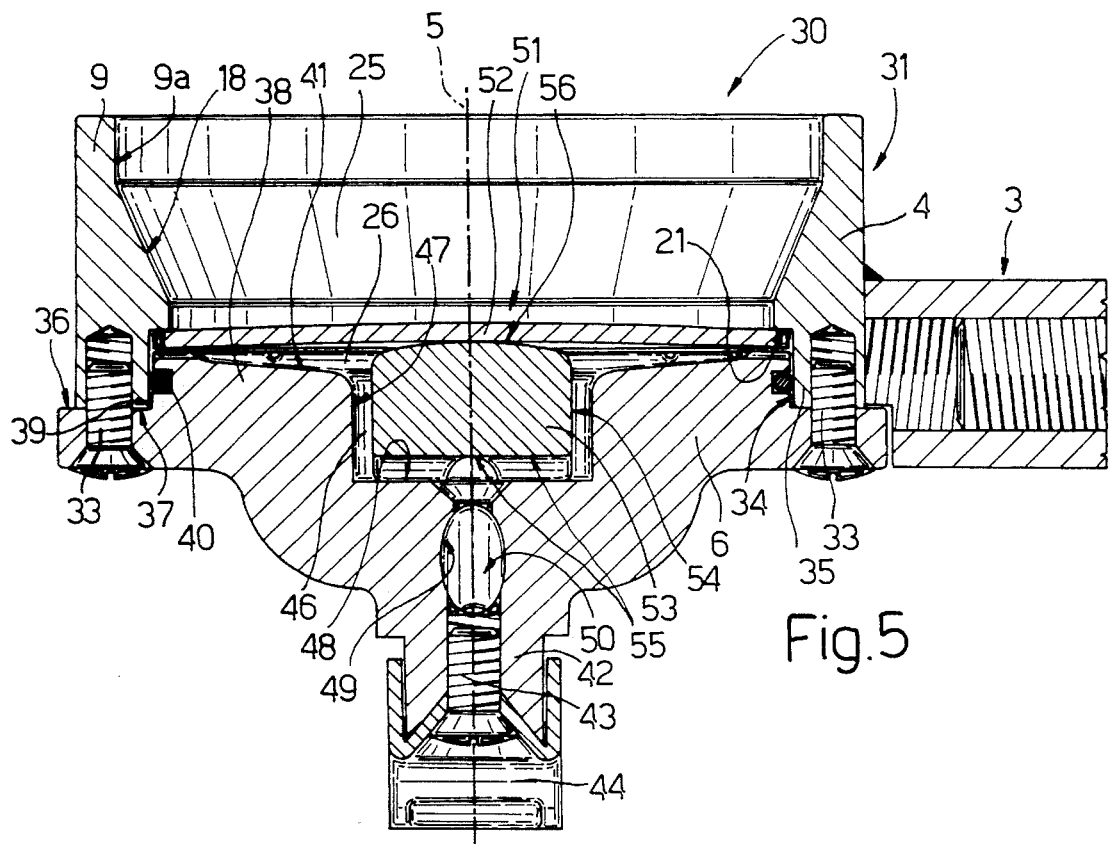
FIG. 5 shows a section along line V—V in FIG. 3.

The embodiment in FIGS. 3 to 5 relates to a percolator cup 30 substantially identical to cup 1, and the component parts of which are therefore indicated wherever possible using the same numbering system.

Cup 30 differs from cup 1 by comprising a tubular upper body 31 coaxial with axis 5, corresponding to wall 4 and insert 17 of cup 1, and defined internally by surface 18; and a lower body 32 comprising bottom wall 6 and releasably connected to body 31 by means of a number of peripheral axial screws 33.

More specifically, body 31 is provided with appendixes 8, and, at the end facing body 32, presents annular seat 21 which is defined externally by the inner cylindrical surface 34 of a tubular appendix 35 extending axially rearwards from body 31 and coaxial with axis 5. Wall 6 of body 32 presents a peripheral annular surface 36 contacting the annular end surface 37 of appendix 35, and fitted through, together with surface 37, with screws 33. Surface 36 surrounds a central axial appendix 38 extending upwards from wall 6 and defined laterally by a cylindrical surface 39 contacting surface 34 of appendix 35 via the interposition of a seal 40. Appendix 38 is shorter than surface 34, and is defined at its free end by an upwardly-concave truncated-cone-shaped surface 41 coaxial with axis 5.

Body 32 also presents a further axial appendix 42 extending downwards and coaxially with axis 5 from wall 6 on the opposite side to appendix 38, and fitted on its free end, by means of a screw 43, with a curved elongated element 44 perpendicular to axis 5 and having an upper axial outlet groove 45 for the liquid coffee. Body 32 also presents a cavity 46 formed in surface 41 and defined laterally by a substantially cylindrical surface 47 coaxial with axis 5. Cavity 46 is defined rearwards by a flat surface 48 through which is formed a hole 49 coaxial with axis 5 and communicating with groove 45 via two oblique outlet conduits 50 formed in appendix 42.

In cup 30, valve element 24 of cup 1 is replaced by a valve element 51 comprising a circular, elastic, substantially flat plate 52 mounted substantially parallel to the plane of seat 21 and to surface 48, and which slides axially between seat 21 and surface 41. Plate 52 is thinner than the difference in height of surfaces 34 and 39, and cooperates with a spacer 53 forming part of valve element 51 and housed inside cavity 46. Spacer 53 substantially consists of a hexagonal nut, the lateral faces 54 of which define, together with surface 47, a number of axial passages enabling chamber 26, defined by plate 52 on one side and surface 41 on the other, to communicate with hole 49 and consequently with conduits 50. Communication between chamber 26 and hole 49 is assured by two cross grooves 55 formed in the end surface of spacer 53 contacting surface 48.

Spacer 53 presents a convex end surface 56 contacting a central rear surface portion of plate 52, and separated from the plane of seat 21 by a distance less than the thickness of plate 52, so as to flex plate 52 into a slightly conical shape, and maintain the periphery of plate 52 contacting seat 21 with a given pressure inversely proportional to said distance.

Unlike cup 1, wherein the liquid coffee is fed to outlet 7 by plate 22 moving axially against the action of spring 27, outflow of the liquid coffee in cup 30 is produced by flexing the periphery of plate 52.

I claim:

1. A percolator cup for espresso coffee machines, comprising:

a) a cup-shaped casing including first and second chambers;

b) said casing including an outlet for communicating with the exterior;

c) said second chamber communicating with said outlet;

d) valve means positioned inside said second chamber and separating said first and second chambers;

e) said valve means including means for selectively allowing said first chamber to communicate with said second chamber when the pressure inside said first chamber exceeds a threshold value;

f) said casing including a seat for supporting said valve means and allowing communication between said first and second chambers;

g) said valve means including a plate; and h) said valve means including thrust means for maintaining a peripheral portion of said plate in frontal contact with said seat at a preselected pressure.

2. The cup of claim 1, and including:

a) a tubular insert inside said casing; and b) said tubular insert defining a surface of said first chamber.

3. The cup of claim 2, wherein:

a) said tubular insert is made of an inoxidizable material.

4. The cup of claim 1, wherein:

a) said thrust means comprises elastic means.

5. The cup of claim 4, wherein:

a) said elastic means comprises a spring positioned inside said second chamber.

6. The cup of claim 5, wherein:

a) said spring is interposed between said plate and a portion of said second chamber.

7. The cup of claim 1, wherein:

a) said plate comprises an elastic plate mounted in an axially slidable manner in said second chamber.

8. The cup of claim 1, wherein:

a) said thrust means comprises a spacer interposed between said plate and a portion of said second chamber; and b) said spacer pressing axially on a central portion of said plate for maintaining said peripheral portion of said plate in frontal contact with said seat.

9. The cup of claim 8, wherein:

a) said casing comprises a generally tubular upper body having an inner annular shoulder facing downwardly and defining said seat.

10. The cup of claim 9, wherein:

a) said casing comprises a lower body releasably connected to said upper body;

b) said lower body defining a bottom wall for said casing; and c) said lower body supporting said spacer.

11. The cup of claim 10, wherein:

a) said outlet comprises a plurality of conduits in said lower body.

12. The cup of claim 11, wherein:

a) said lower body includes a generally central cavity; and b) said conduits communicate with said central cavity.

13. The cup of claim 12, wherein:

a) said central cavity partially houses said spacer.

14. The cup of claim 12, wherein:

a) said central cavity is generally cylindrical in configuration; and b) said spacer defines lateral faces for ensuring communication between said second chamber and said conduits.

15. The cup of claim 12, wherein:
a) said spacer includes a generally convex end projecting through said cavity and contacting said plate.

16. The cup of claim 15, wherein:
a) said convex end of said spacer is separated from said seat by a preselected distance; and
b) said distance is less than the thickness of said plate.

* * * * *